A. E. OSBORN.
TRANSMISSION GEARING.
APPLICATION FILED JUNE 4, 1908.

995,552.

Patented June 20, 1911.

2 SHEETS—SHEET 1.

WITNESSES:

INVENTOR
Alden E. Osborn.
BY
Isaac B. Owens.
ATTORNEY

A. E. OSBORN.
TRANSMISSION GEARING.
APPLICATION FILED JUNE 4, 1908.

995,552.

Patented June 20, 1911.

2 SHEETS—SHEET 2.

UNITED STATES PATENT OFFICE.

ALDEN E. OSBORN, OF NEW YORK, N. Y.

TRANSMISSION-GEARING.

995,552.   Specification of Letters Patent.   Patented June 20, 1911.

Application filed June 4, 1908.   Serial No. 436,552.

*To all whom it may concern:*

Be it known that I, ALDEN E. OSBORN, of the city of New York, borough of Bronx, county and State of New York, have invented certain new and useful Improvements in Transmission - Gearing, of which the following is a full, clear, and exact specification, such as will enable others skilled in the art to which it appertains to make and use the same.

My invention relates to a gearing for transmitting motion at varying speeds in opposite directions at the will of the operator.

The invention is especially adapted for motor vehicles but it is in no sense limited to this use.

The invention resides in certain features of structure and organization which will be fully set forth hereinafter and particularly pointed out in the claims.

Figure 1:
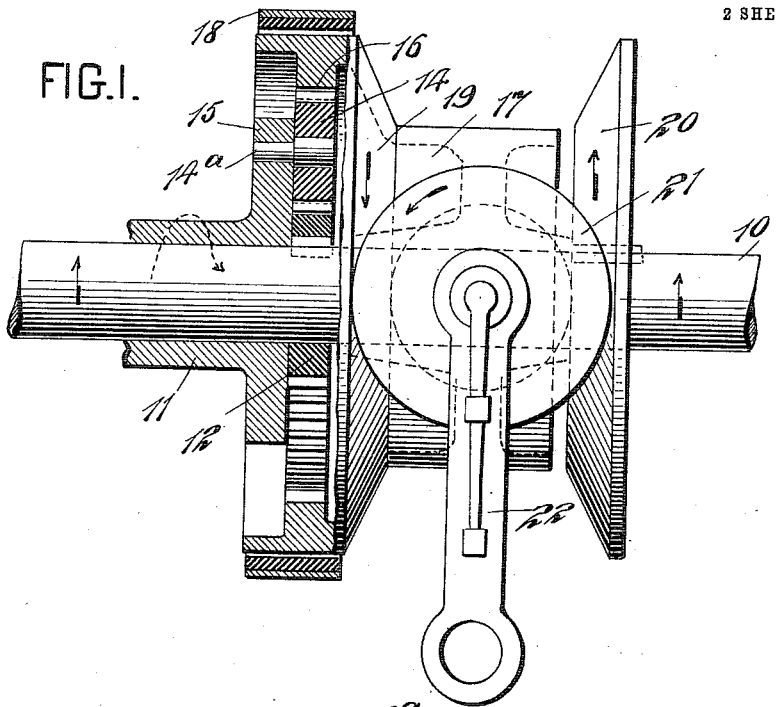
Figure 2:
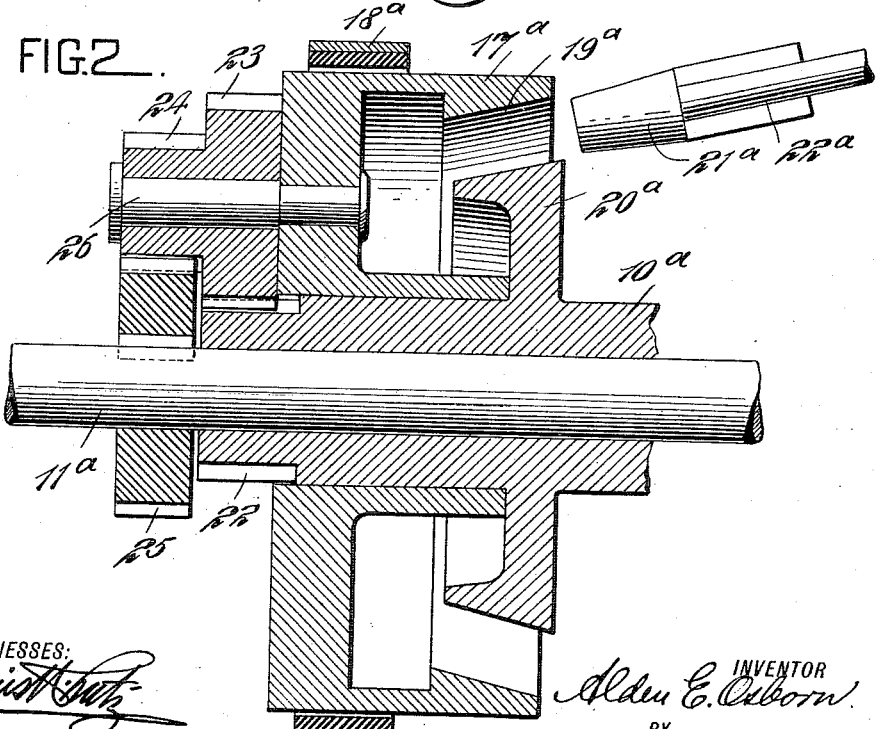
Figure 3:
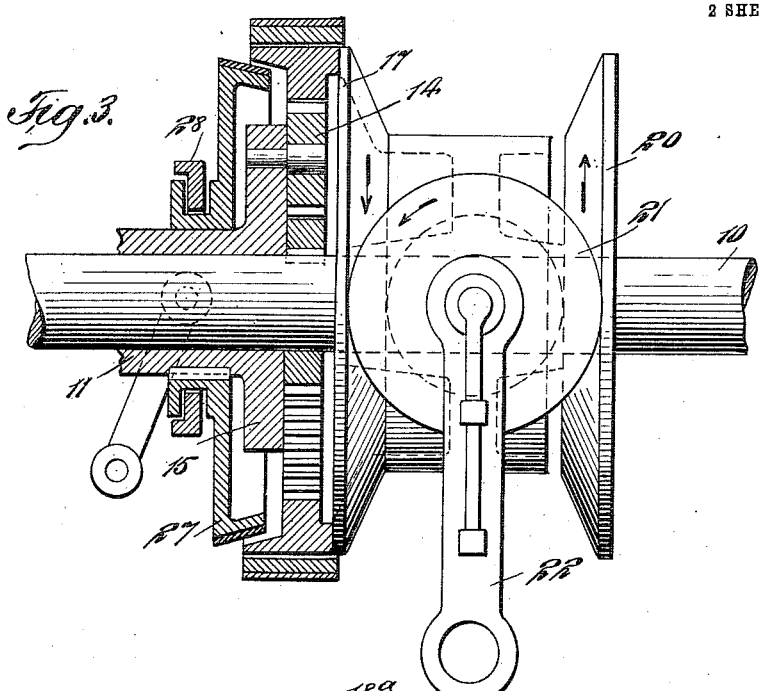
Figure 4:
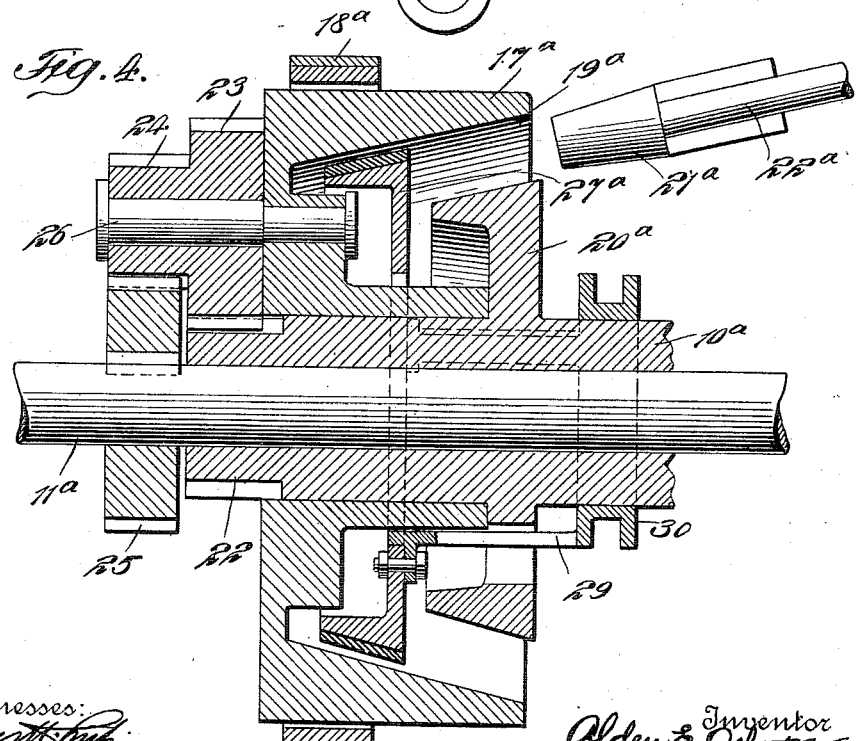

Reference is had to the accompanying drawings which illustrate as examples, two of the various possible forms in which my invention may be practically embodied, in which drawings, Figure 1 is a plan or elevational view of one form with parts in section; Fig. 2 is a section of the other form, and Figs. 3 and 4 are views similar to Figs. 1 and 2, but showing a clutch connected with the gearing.

Referring first to Fig. 1, 10 indicates the prime mover of the gearing, shown in the form of a shaft and hereinafter termed the driving element; and 11 indicates the part which is rotated by the gearing, shown in the form of a sleeve loose on the driving element 10 and hereinafter termed the driven element. Keyed to the driving element 10 is a pinion 12 which is meshed with a pinion 14 rotatably mounted by a pin 14ᵃ on a flange 15 of the driven element 11; and this pinion, 14, is also meshed with an internal gear ring 16 formed on the mount 17. The mount 17 is loosely carried on the driving element 10. 18 indicates a brake strap or other means by which rotation of the mount 17 may be restrained at will. Upon stopping the motion of the mount, the constant rotation of the driving member 10 will, through the gear 12, rotate the gear 14 and this gear, 14, climbing around the now stationary gear ring 16 will carry its axial pin 14ᵃ in an orbit around the gear 12, thus driving the element 11 in the same direction as the direction of rotation of the driving element, but at a lower speed dependent upon the ratio of the gears, all of which is known in the prior art. Upon releasing the brake or restraining device 18, the mount 17 will simply rotate idly and no motion will be transmitted between the driving and driven elements.

On the mount 17 is formed a beveled friction face 19, opposite which is a beveled friction disk 20 keyed on the driving element 10. Adapted to coact with these friction gears 19 and 20 is a beveled friction gear 21, the axis of which is disposed at right angles to that of the gears 19 and 20, so that when engaged with such gears, the gear 21 will rotate the mount 17 in a direction opposite the direction of rotation of the driving element 10. The friction gear 21 is mounted independently of the gearing and is exterior as contradistinguished from interior thereof. Preferably this friction gear is sustained for example on the frame of the automobile; the specific details of the devices for accomplishing this are apparent and will, in practice, be largely controlled by the conditions surrounding the installation of the gear as a whole. Said friction gear 21 should also be fitted with a device for moving it at will, in and out of contact with the gears 19 and 20, the specific form of which device is also immaterial. In Fig. 1, 22 may be taken to indicate the devices for mounting and adjusting the gear 21 as described.

Still referring to Fig. 1, it has appeared hereinbefore that upon stopping rotation of the mount 17, the action of the gears 12, 14 and 16 will rotate the driven member in the same direction as the driving member but at a slower speed. Now, let it be supposed that the brake strap 18 is released and instantly thereafter the friction gear 21 engaged with the gears 19 and 20, resulting in positive rotation of the mount 17 in a direction reverse to that of the rotation of the driving element 10. The ratio of the gears 20, 21 and 19 is such, in Fig. 1, that the reverse motion of the mount 17 due to the action of the friction gears will be faster than the forward motion of the parts 15 and 11 due to the action of the gears 12, 14 and 16, the result of which is that the faster reverse motion of the mount 17 carries the planetary gear system 14—16 bodily around in a reverse direction, notwithstanding the fact that these gears are operating independently with a tendency to drive the member 11 forward. It will be seen, therefore, that according to the adjustment of the brake 18 and gear 21 the driven element is caused to rotate either reversely or forwardly and in each case at a lower speed than that of the driving element 10. The precise speeds of course are dependent upon the ratios of the gearings, which ratio may be varied to suit the conditions desired. It will still further be apparent that different results may be obtained by modifications in the form of the gearing 20, 21 and 19 or devices employed as the equivalent thereof. Thus, if the mount 17 is left free to rotate, the gear will operate idly without transmission of any sort, but if the devices 20, 21 and 19 or equivalent devices be arranged to allow the mount 19 to move under the action of the gears 12, 14 and 16, but not with that freedom which it would move were the mount wholly unrestrained, the gearing will still transmit motion in a forward direction (i. e. the same direction of the driving element 10) but at a speed less than that at which it would be transmitted were the mount 17 held against all rotation. Further, the gearing may be organized in multiple or modified in various other ways to increase its range of usefulness without departing from the spirit of my invention, it being here illustrated in its simplex form for the sake of conciseness of description.

Referring to Fig. 2, 10$^a$ is the driving member and 11$^a$ the driven member connected by a train of four-spur gears 22, 23, 24 and 25 of which the gears 23 and 24 are fast to each other and turn loosely on a pin 26 carried by the mount 17$^a$. The mount 17$^a$ is loose on the driving member 10$^a$. When the mount is restrained by the brake strap 18$^a$ or other means, the gears 22, 23, 24 and 25, by a plain spur driving action, rotate the driven member 11$^a$ in the same direction as the driving member but at a slower speed, dependent of course upon the ratio of the gears. The mount 17$^a$ has a beveled interior friction face 19$^a$ and the driving element 10$^a$ has a beveled gear 20$^a$ with which coacts a tapering friction roller 21$^a$ connected with a suitable device 22$^a$ for mounting it independently and exteriorly of the gear and for permitting its operation in the same manner and for the same purpose as that of the devices 22 associated with the gear 21 shown in Fig. 1.

When the friction roller 21$^a$ is in active position and the brake strap 18$^a$ relaxed, the mount 17$^a$ will be rotated reversely to the driving element 10$^a$ at a speed dependent upon the proportions of the driving surfaces, which speed, according to the type of the device shown in Fig. 1, should be, however, greater than the speed of rotation due to the action of the gear system 22, 23, 24 and 25. This reverse motion of the mount 17$^a$ will, through the pin 26, carry the gears 23 and 24 with the mount and drive the member 11$^a$ reversely at a speed equal to that of the mount, less the speed of the forward motion due to the action of the gear system 22—25.

In Figs. 3 and 4 I have illustrated two transmission gearings substantially identical with those illustrated in Figs. 1 and 2 but having a clutch for locking all of the parts to secure direct full speed transmission ahead. In Fig. 3 this clutch is in the form of a cone 27 having a suitable bearing face and adapted to enter within a conical socket in the member 17. The clutch cone is keyed to the sleeve 11 so as to rotate therewith and when moved into operative position compels the mount 17 and the sleeve 11 to rotate together in the same direction and at the same speed. The clutch cone may be operated in any suitable manner as, for instance, by a yoke 28. In the form shown in Fig. 4, the member 17$^a$ is provided with a conical seat for receiving a clutch cone 27$^a$. This clutch cone is operated in any suitable manner as to lock the member 10$^a$ to the member 17$^a$. As shown, the clutch cone has arms 29 extending out through apertures in the member 20$^a$ and attached to a collar 30 keyed on the member 10$^a$. This collar may be operated in any suitable manner as, for instance, by a suitable yoke not shown. The details of construction of the clutch do not involve any feature of my invention, as these may be varied at will. It is only essential that the parts be directly connected for simultaneous rotation at the same speed and in the same direction.

Having thus described my invention, what I claim as new and desire to secure by Letters Patent of the United States is:

1. In a transmission gearing the combination of a gear system, a movable mount having connection with an element thereof, means for restraining at will the motion of the mount, and controllable means for positively driving the mount independently of the action of the gear system but at a differing speed therefrom.

2. In a transmission gearing the combination of a gear system, a movable mount having connection with an element thereof, means for restraining at will the motion of the mount, and controllable means mounted independently of the gearing for positively driving the mount.

3. In a transmission gearing the combination of a gear system, a movable mount having connection with an element thereof, means for restraining at will the motion of the mount, and controllable means mounted independently of the gearing for positively driving the mount similarly to the action of the gear system but at a higher speed.

4. In a transmission gearing the combination of driving and driven elements, a gear system, a movable mount having connection with an element thereof, means for restraining at will the motion of the mount, and means for positively driving the mount from the driving element separately from the action of the gear system and at a higher speed.

5. In a transmission gearing the combination of driving and driven elements, a gear system, a movable mount having connection with an element thereof and having a gear surface and means for restraining at will the motion of the mount, a gear connected to the driving element and an intermediate gear meshed with said gear on the driving element and with the gear surface on the mount.

6. In a transmission gearing the combination of driving and driven elements, a gear system, a movable mount having connection with an element thereof and having a gear surface, means for restraining at will the motion of the mount, a gear connected to the driving element, an intermediate gear meshed with said gear on the driving element and with the gear surface on the mount, and means for mounting the intermediate gear independently of the transmission gearing.

7. In a transmission gearing the combination of driving and driven elements, a gear system, a movable mount having connection with an element thereof and having a gear surface, means for restraining at will the motion of the mount, a gear connected to the driving element, an intermediate gear meshed with said gear on the driving element and with the gear surface on the mount, and means for engaging and disengaging the intermediate gear at will.

8. In a transmission gearing the combination of driving and driven elements, a gear system, a movable mount having connection with an element thereof and having a gear surface, means for restraining at will the motion of the mount, a gear connected to the driving element, an intermediate gear meshed with said gear on the driving element and with the gear surface on the mount, and means mounted independently of the transmission gearing for engaging and disengaging the intermediate gear at will.

9. In a transmission gearing the combination of rotating driving and driven elements, a gear system, a rotatable mount having connection with an element thereof, means for restraining at will the rotation of the mount and controllable means for positively rotating the mount similarly to the action of the gear system but at a higher speed.

10. In a transmission gearing the combination of a gear system, a rotatable mount having connection with an element thereof, means for restraining at will the rotation of the mount and a controllable means mounted independently of the gear system for positively rotating the mount.

11. In a transmission gearing the combination of a gear system, a rotatable mount having connection with an element thereof, means for restraining at will the rotation of the mount and a controllable means mounted independently of the gear system for positively rotating the mount in a direction contrary to the action of the gear system and at a higher speed.

12. In a transmission gearing the combination with driving and driven elements and a movable mount of a shaft or axle in substantially stationary relation to said driving and driven elements and means mounted on said shaft or axle for transmitting motion between said driving member and said movable mount.

13. In a transmission gearing the combination of a gear system, a movable mount having connection with an element thereof, means for restraining at will the motion of the mount, a friction gear for positively driving the mount and means for moving the friction gear in and out of action at will.

14. In a transmission gearing, the combination with driving and driven elements and a movable mount, of means for restraining the mount at will and means for transmitting motion between the driving elements and said mount, said means including a roller having friction contact with a part on the driving element.

15. In a transmission gearing the combination of a gear system, a movable mount having connection with an element thereof, means for restraining at will the motion of the mount, and controllable means for positively driving the mount such means including a shaft supporting an element thereof and extending at an angle to the axis of the driving and driven elements.

16. In a transmission gearing the combination of a gear system, a movable mount having connection with an element thereof, means for restraining at will the motion of the mount, a friction gear secured to the driving element, an intermediate friction gear engaging the first named gear and the mount and devices for carrying the intermediate friction gear.

17. In a transmission gearing the combination of a gear system, a movable mount having connection with an element thereof, means for restraining at will the motion of the mount, a friction gear secured to the driving element, an intermediate friction gear engaging the first named gear and the mount and devices for carrying the intermediate friction gear, such devices including a shaft extending at an angle to the axis of the driving and driven elements.

18. In a transmission gearing the combination of a gear system, a movable mount having connection with an element thereof, means for restraining at will the motion of the mount, a friction gear secured to the driving element, an intermediate friction gear engaging the first named gear and the mount and devices for carrying the intermediate friction gear, such means including a shaft mounting the intermediate friction gear and extending at right angles to the axis of the driving and driven elements.

19. In a transmission gearing the combination of a driving member, a driven member and a restrainable member, means for connecting these three members whereby when the restrainable member is held from free rotation motion is transmitted between the driving and driven members and means for driving the restrainable member from the driving member, said means being independent of the first mentioned connecting means and including a wheel having its axis of rotation at an angle to the axis of rotation of one the said members.

20. In a transmission gearing the combination of a driving member, a driven member and a restrainable member all rotatable around the same axis, means for connecting these three members whereby when the restrainable member is held from free rotation motion is transmitted between the driving and driven members and means for driving the restrainable member said means being independent of the first mentioned connecting means and including a wheel having its axis of rotation at an angle to the axis of rotation of said driving, driven and restrainable members.

21. In a transmission gearing, the combination of a gear system, a movable mount having connection with an element thereof, means for restraining at will the motion of the mount and controllable means independent of the gear system for positively driving the mount in the same direction as said mount is driven by the action of the gear system but at a different speed therefrom.

22. In a transmission gearing, the combination of a gear system, a movable mount having connection with an element thereof, means for restraining at will the motion of the mount and controllable means mounted independently of the gearing for positively driving the mount similarly to the action of the gear system but at a higher speed.

23. In a transmission gearing having driving and driven elements, the combination of a gear system, a movable mount having connection with an element thereof, means for restraining at will the motion of the mount, and means including an element rotatable about the stationary axis separate from the axis of the gear system, for positively driving the mount from the driving element separately from the action of the gear system and at a higher speed.

24. In a transmission gearing the combination of rotating driving and driven elements, a gear system, a rotatable mount having connection with an element thereof, means for restraining at will the rotation of the mount and controllable means for positively rotating the mount similarly to the action of the gear system but at a higher speed.

25. In a transmission gear the combination of a rotary driving member, a gear system having an element connected with said driving member, a rotary mount having connection with another element of said gear system, means for restraining at will the motion of the mount and a controllable means independent of the gear system for driving the mount in a direction opposite to that in which the driving member rotates but in the same direction as it is rotated by the gear system although at different speed than that at which the gear system turns it.

In testimony whereof I have signed my name to this specification in the presence of two subscribing witnesses.

ALDEN E. OSBORN.

Witnesses:
  John H. Gratacap,
  Thos. O. Arden.

---

Copies of this patent may be obtained for five cents each, by addressing the "Commissioner of Patents, Washington, D. C."